(12) United States Patent
Takeda

(10) Patent No.: US 7,116,617 B2
(45) Date of Patent: Oct. 3, 2006

(54) OPTICAL DISK DEVICE

(75) Inventor: Naoto Takeda, Tokyo (JP)

(73) Assignee: Teac Corporation, Tokyo (JP)

( * ) Notice: Subject to any disclaimer, the term of this patent is extended or adjusted under 35 U.S.C. 154(b) by 733 days.

(21) Appl. No.: 10/241,254

(22) Filed: Sep. 10, 2002

(65) Prior Publication Data

US 2003/0053386 A1   Mar. 20, 2003

(30) Foreign Application Priority Data

Sep. 20, 2001   (JP) ............................. 2001-286360

(51) Int. Cl.
*G11B 7/00* (2006.01)
(52) U.S. Cl. .................... 369/47.53; 369/116
(58) Field of Classification Search ................ 369/116, 369/47.5, 47.51, 47.52, 47.53, 59.12, 475
See application file for complete search history.

(56) References Cited

U.S. PATENT DOCUMENTS

| | | | |
|---|---|---|---|
| 5,550,799 A | 8/1996 | Inoue et al. | |
| 6,510,116 B1 * | 1/2003 | Miyagawa et al. | 369/59.12 |
| 6,810,050 B1 * | 10/2004 | Nihei et al. | 372/38.02 |
| 6,898,163 B1 * | 5/2005 | Takeda | 369/47.53 |

FOREIGN PATENT DOCUMENTS

| | | |
|---|---|---|
| JP | 2-247824 A | 10/1990 |
| JP | 6-76294 | 3/1994 |
| JP | 7-220280 A | 8/1995 |
| JP | 11-25538 | 1/1999 |
| JP | 2000137918 A | 5/2000 |
| JP | 2001-184792 A | 7/2001 |

* cited by examiner

*Primary Examiner*—Nabil Hindi
(74) *Attorney, Agent, or Firm*—Christensen O'Connor Johnson Kindness PLLC

(57) ABSTRACT

An optical disk device in which the laser light power for writing data onto an optical disk is optimized. Test data is written onto an optical disk while laser light power is varied and the laser light power is optimized based on the quality of replayed signals of the test data. The space value of the replayed signal of the test data is detected and, when the space value is a value which should not exist, it is judged that 3T mark period is missing or excessively written and the laser light power in which such a space value is obtained is removed from the candidates for the optimum laser light power. Also, jitter and error rate of the replayed signal are detected. Even when the jitter is at a desirable value, if the error rate is greater than or equal to a predetermined value, the laser light power in which such an error rate is obtained is removed from consideration as a possible optimum laser light power.

19 Claims, 14 Drawing Sheets

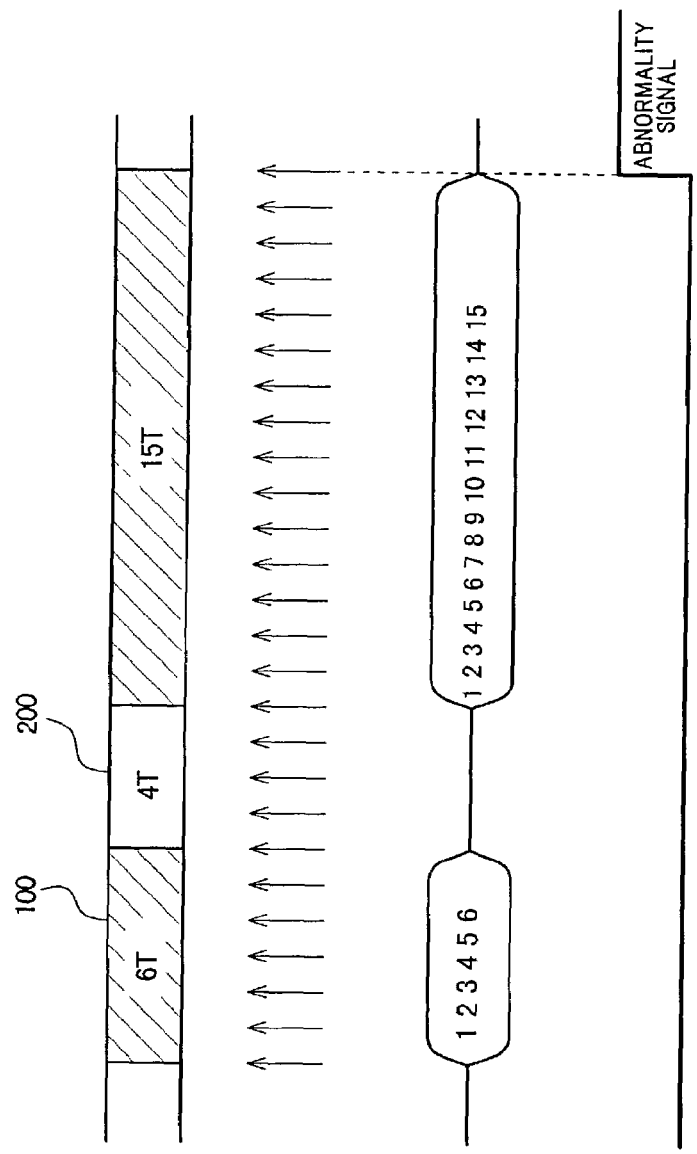

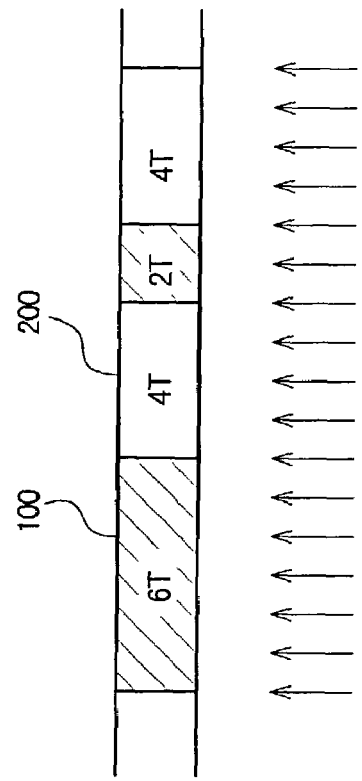
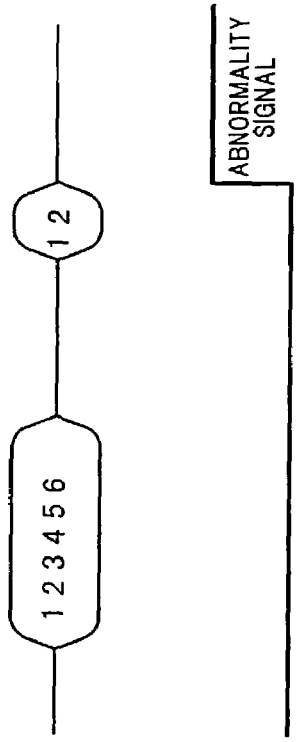
FIG. 4A
FIG. 4B
FIG. 4C
FIG. 4D

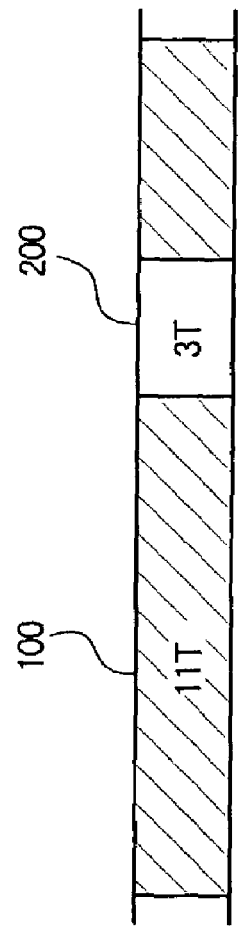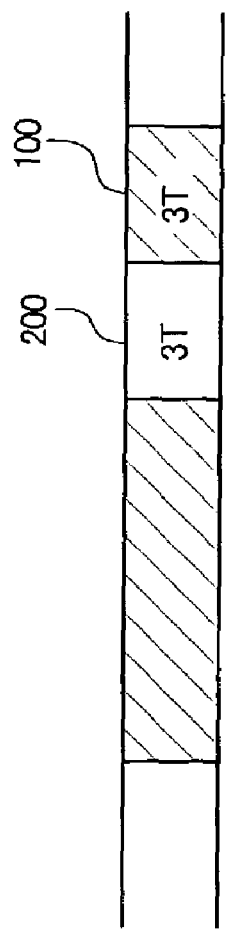
FIG. 7A
FIG. 7B

OPTICAL DISK DEVICE

BACKGROUND OF THE INVENTION

1. Field of the Invention

The present invention relates to an optical disk device, and in particular to optimization of a writing power when data is written onto a recordable optical disk.

2. Description of the Related Art

When data is to be written onto a recordable optical disk such as a CD-R, CD-RW, DVD-R, or DVD-RW disk, test data is repeatedly written as a test in a predetermined region (PCA area) of the optical disk while the writing power is varied, the test data is replayed, a writing power in which the quality of the replayed signal is maximized is selected as the optimum writing power, and the data is written (a process commonly referred to as optimum power control (OPC)).

For example, Japanese Patent Laid-Open Publication No. 2000-137918 discloses such a method in which test data is written as a test in the PCA area of an optical disk while varying the writing power, jitter value of the written test data is measured, and the writing power in which the jitter value is minimized is determined as the optimum writing power.

In a CD-R or CD-RW system, signals having lengths from 3T to 11T are written and in a DVD-R or DVD-RW system, signals having lengths from 3T to 14T are written. Therefore, when the writing power is to be optimized through OPC as described above, it is desirable to optimize the writing power using test data of length 3T to 11T or 3T to 14T.

However, in general, it is difficult to write the shortest signal, the signal with length 3T ("3T signal"), and therefore, the signal may sometimes be missing because of a writing error. Because the jitter value is calculated from the edge difference between the rising edge and the falling edge of the signal and a reference clock, even when the 3T signal is missing, for example, the jitter value is measured at the rising edge or the falling edge of the remaining signals of 4T to 11T or 4T to 14T. As a result, the jitter value appears to be small although the test data is not normally written, and there had been a problem in that the optimum writing power is selected based on this apparently small jitter value.

This problem will now be described in more detail. FIGS. 12A through 12E show a test data string, rising and falling edges of a replayed binarized signal based on which jitter value is calculated, the reference clock, and difference between the rising and falling edges and the reference clock. FIG. 12A shows the actual data string of the test data. As shown in FIG. 12A, it is assumed that the actual test data has a data string of 6T (mark), 3T (space), 3T (mark), 3T (space), 4T (mark), 3T (space), 3T (mark), 9T (space) periods. Here, "mark" indicates a marking period in which laser light of a writing power is illuminated and a pit is actually formed on the optical disk and "space" indicates a space period in which laser light of a bias (replay) power is illuminated between the marking periods of writing power and no pit is formed. In a DVD-R system, however, a multi-pulse is employed for forming the pit and the bias level between the multi-pulses is "mark" and not "space".

FIG. 12B shows a replayed signal obtained by replaying the written test data. FIG. 12B also shows a threshold value for binarizing the replayed signal. Because the 6T (mark) period and 4T (mark) period have relatively large pulse width, sufficient energy can be illuminated to write a pit, and, thus, the level of the replayed signal is greater than the threshold value. However, the 3T (mark) period has a small pulse width and, when the writing power is insufficient, the level of replayed signal may sometimes fall short of the threshold value because a pit is not adequately formed. In such a case, when the replayed signal is binarized using the threshold value, the 3T (mark) period is not captured and will be missing.

FIG. 12C shows a binarized signal obtained by binarizing the replayed signal. Because3T (mark) period is missing, a data signal of 6T (mark), 9T (space), 4T (mark), and 15T (space) periods, which differs from the original test data, is retrieved. When such a binarized signal and a reference clock as shown in FIG. 12D are compared and the edge difference between the rising and falling edges of the binarized signal and the reference clock is detected, a signal as shown in FIG. 12E would be obtained. As shown, because the 3T (mark) period is missing, the edge difference in a corresponding portion present in the original data will not be detected. As a result, the overall edge difference, that is, the jitter value, appears smaller than it actually is. Therefore, jitter value for the writing power appears to be smaller than the actual value, and thus, there is a problem in that although in reality, the writing power is insufficient, this power may be erroneously determined as the optimum writing power.

On the other hand, there may be cases wherein, instead of missing a 3T (mark) signal, the 3T (mark) signal is excessively recorded due to excessive writing power, and is detected as data of a length 4T or more. In such a case also, although in reality, the test data is not normally written, the jitter value appears smaller.

FIGS. 13A–13E show a specific example of such a case. As shown in FIG. 13A, the actual test data contains 6T (mark), 3T (space), 3T (mark), 3T (space), 4T (mark), 3T (space), 3T (mark), and 9T (space) periods.

FIG. 13B shows a replayed signal. When the 3T mark signal is excessively recorded, the portion in which the level of the replayed signal exceeds the threshold value level becomes larger, resulting in a binarized signal of 6T (mark), 3T (space), 4T (mark), 2T (space), 4T (mark), 3T (space), 4T (mark), and 8T (space) periods as shown in FIG. 13C. As can be seen, the actual 3T (mark) period is detected as a 4T (mark) period and the actual 3T (space) period appears to be a 2T (space) period. In this case, when the edge difference is detected between the binarized signal and the reference clock, the edge difference appears smaller than that of a 3T (mark) period, resulting in smaller apparent jitter value. Because in OPC, the writing power with minimum jitter value is determined as the optimum writing power, a writing power may be erroneously determined as the optimum writing power even when the writing power is actually excessive.

FIG. 14 shows a relationship between the pulse width of 3T (writing power) and jitter value. In FIG. 14, the horizontal axis represents the pulse width (writing power) of 3T (mark) period and the vertical axis represents the jitter value. Normally, when a 3T (mark) period is written, the jitter becomes a minimum at a certain point and increases as the pulse width moves away from the minimum point. However, when the pulse width of a 3T (mark) period is small (insufficient writing power), as in the region I in FIG. 14 and is missing, the jitter value becomes smaller because the edge difference of the actual 3T (mark) period does not appear as described above. On the other hand, when the pulse width of 3T (mark) period is excessively increased (excessive writing power) as in region II in FIG. 14, a 3T (mark) period appears as a 4T (mark) period as described above and jitter value again appears smaller as the 3T (mark) period is not present. Therefore, as shown in FIG. 14, the characteristic appears to have a shape with two peaks. In this case, the writing power where the jitter value is minimized cannot be calculated, and a writing power which is smaller than the actual optimum writing power or a writing power which is greater than the actual optimum writing power may be erroneously determined as the optimum writing power, resulting in a problem in that the actual data cannot be written with high quality.

SUMMARY OF THE INVENTION

Accordingly, an object of the present invention is to provide an optical disk device in which the writing power can be optimized.

According to one aspect of the present invention, there is provided an optical disk device comprising means for writing test data onto an optical disk while varying laser light power; means for replaying the test data; means for judging presence of an abnormality in the test data based on a space value of the replayed signal; and means for optimizing the laser light power based on the judgment result by the means for judging.

According to another aspect of the present invention, it is preferable that, in the optical disk device, the means for judging judges the abnormality of the test data when the space value is a value which should not exist. The space value which should not exist may be, for example, any one of 1T, 2T, 12T, 13T, and 15T, which is caused by a missing 3T mark period or an excessive 3T mark period. More specifically, in a CD drive, the non-existence value includes 1T, 2T, 12T, etc., and in a DVD drive, the non-existence value includes 1T, 2T, 12T, 13T, 15T, and so on. When the test data has a pattern with a known and fixed length space period (for example, 4T), any value other than the fixed length is also considered a non-existence value.

According to another aspect of the present invention, it is preferable that, in the optical disk device, the means for optimizing selects, as the optimum laser light power, the laser light power at which the jitter of the replayed signal is minimized, and the means for judging increases the jitter of the replayed signal of the test data when the test data is judged to be abnormal. With such a configuration, it is possible to eliminate as a candidate for the optimum laser light power a laser light power for which the test data is judged as abnormal.

According to yet another aspect of the present invention, there is provided an optical disk device comprising means for writing test data onto an optical disk while varying laser light power; means for replaying the test data; means for detecting jitter of the replayed signal; means for optimizing the laser light power based on the jitter; means for detecting error rate of the replayed signal; and means for detecting abnormality which outputs a signal indicating an abnormality in the jitter when the error rate exceeds a predetermined value.

According to another aspect of the present invention, it is preferable that, in the optical disk device, the means for optimizing selects, as the optimum laser light power, the laser light power at which the jitter is minimized, and the means for detecting abnormality increases the jitter when the error rate is greater than or equal to the predetermined value. With such a configuration, it is possible to eliminate, from the candidates for the optimum writing power, the laser light power at which the error rate exceeds the predetermined level.

The present invention can be applied to any optical disk device for writing data onto an optical disk.

While the present invention will be more clearly understood with reference to the following embodiments, the scope of the present invention is not limited to the embodiments.

BRIEF DESCRIPTION OF THE DRAWINGS

FIG. 3A is a diagram for explaining a test data pattern (insufficient writing of a 3T mark period).

FIG. 3B is a diagram showing a synchronous clock.

FIG. 3C is a diagram for explaining a space count value in FIG. 3A.

FIG. 3D is a diagram for explaining output of an abnormality signal.

FIG. 4A is a diagram for explaining a test data pattern (excessive writing of a 3T mark period).

FIG. 4B is a diagram showing a synchronous clock.

FIG. 4C is a diagram for explaining a space count value in FIG. 4A.

FIG. 4D is a diagram for explaining output of a signal indicating an abnormality (an abnormality signal).

FIG. 7A is a diagram showing a test data pattern.

FIG. 7B is a diagram showing another test data pattern.

DESCRIPTION OF PREFERRED EMBODIMENTS

Preferred embodiments of the present invention will now be described with reference to the drawings using a DVD-R drive as an example.

Figure 1:
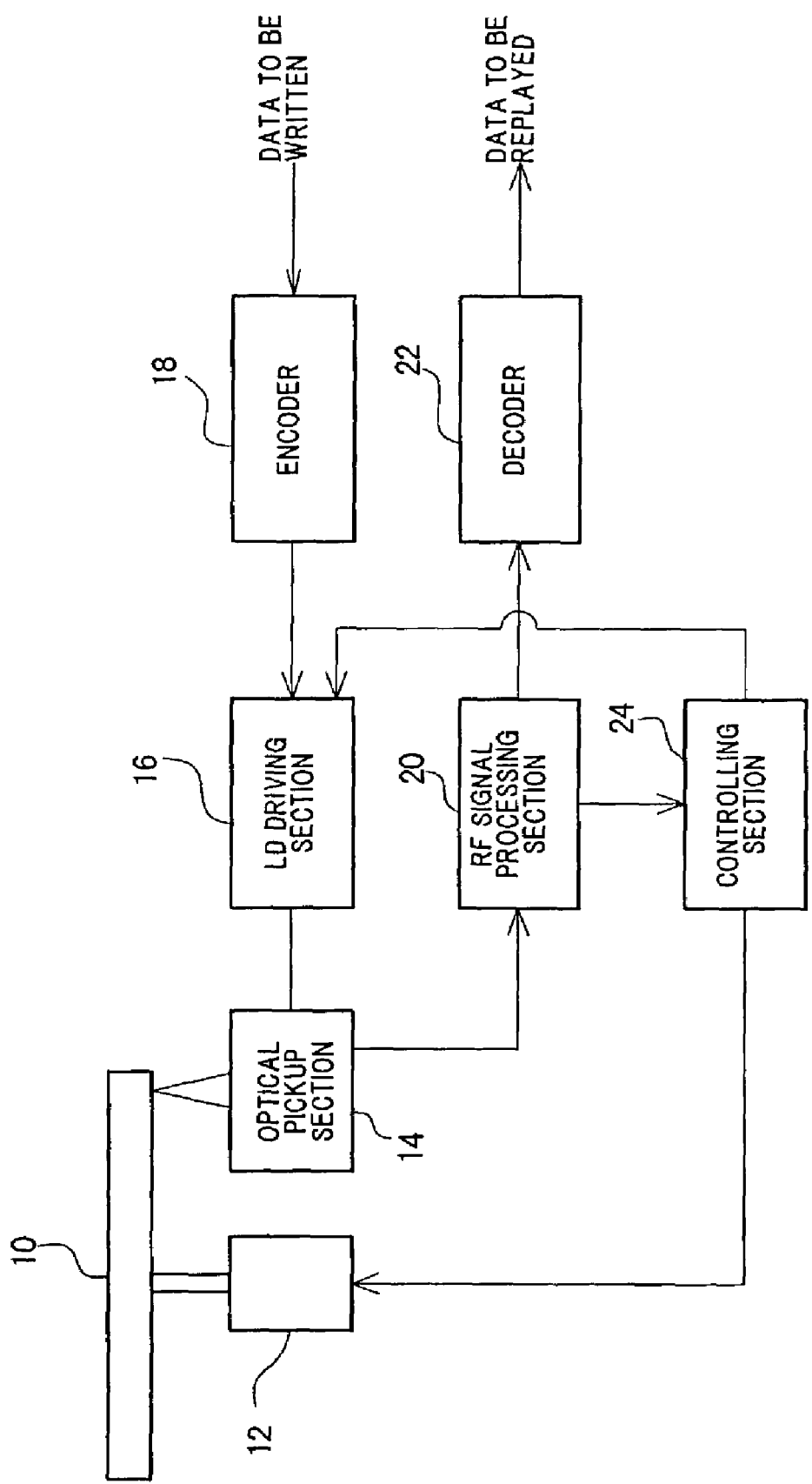
FIG. 1 is a structural block diagram of an optical disk device.

FIG. 1 is a block diagram showing the significant structures of an optical disk device according to a first embodiment. An optical disk 10 is CAV controlled (or CLV controlled) by a spindle motor 12.

An optical pickup section 14 provided to oppose the optical disk 10 writes data onto the optical disk 10 by emitting laser light of a writing power from a laser diode (LD). The writing of data may be effected by fusing and subliming a portion of a writing film of the optical disk 10 to form a pit, or, alternatively, by heating and quickly cooling so that the state transitions from a crystalline state to an amorphous state.

When data is written, the data to be written is supplied to an encoder 18 and the data encoded by the encoder 18 is supplied to an LD driving section 16. The LD driving section 16 generates a drive signal based on the encoded data and supplies the drive signal to the LD of the optical pickup section 14. In addition, a control signal from a control section 24 is supplied to the LD driving section 16 so that the writing strategy and writing power are determined by the control signal.

When, on the other hand, data is replayed, the LD of the optical pickup section 14 illuminates laser light of a replaying power (replaying power<writing power), the reflection light is received, the received reflection light is converted into an electrical signal, and a replay RF signal is obtained. The replay RF signal is supplied to an RF signal processing section 20.

The RF signal processing section 20 comprises an equalizer, a binarizing section, a PLL section, etc., and binarizes the replay RF signal, generates a synchronous clock, and supplies these signals to a decoder 22. The decoder 22 decodes data based on these supplied signals and outputs the decoded data as replay data.

The replay RF signal from the RF signal processing section 20 is also supplied to the control section 24 for evaluating the signal quality. For data replay, the optical disk device also comprises a circuit for controlling the focus servo or tracking servo by respectively producing a tracking error signal or a focus error signal and a circuit for replaying a wobble signal formed on the optical disk 10 for use in address demodulation or control of number of rotations. These structures, however, are identical to those in the conventional art and will not be described in detail.

The control section 24 executes OPC by driving the LD driving section 16, evaluates the signal quality of each set of test written data, and determines the optimum writing power.

Figure 2:
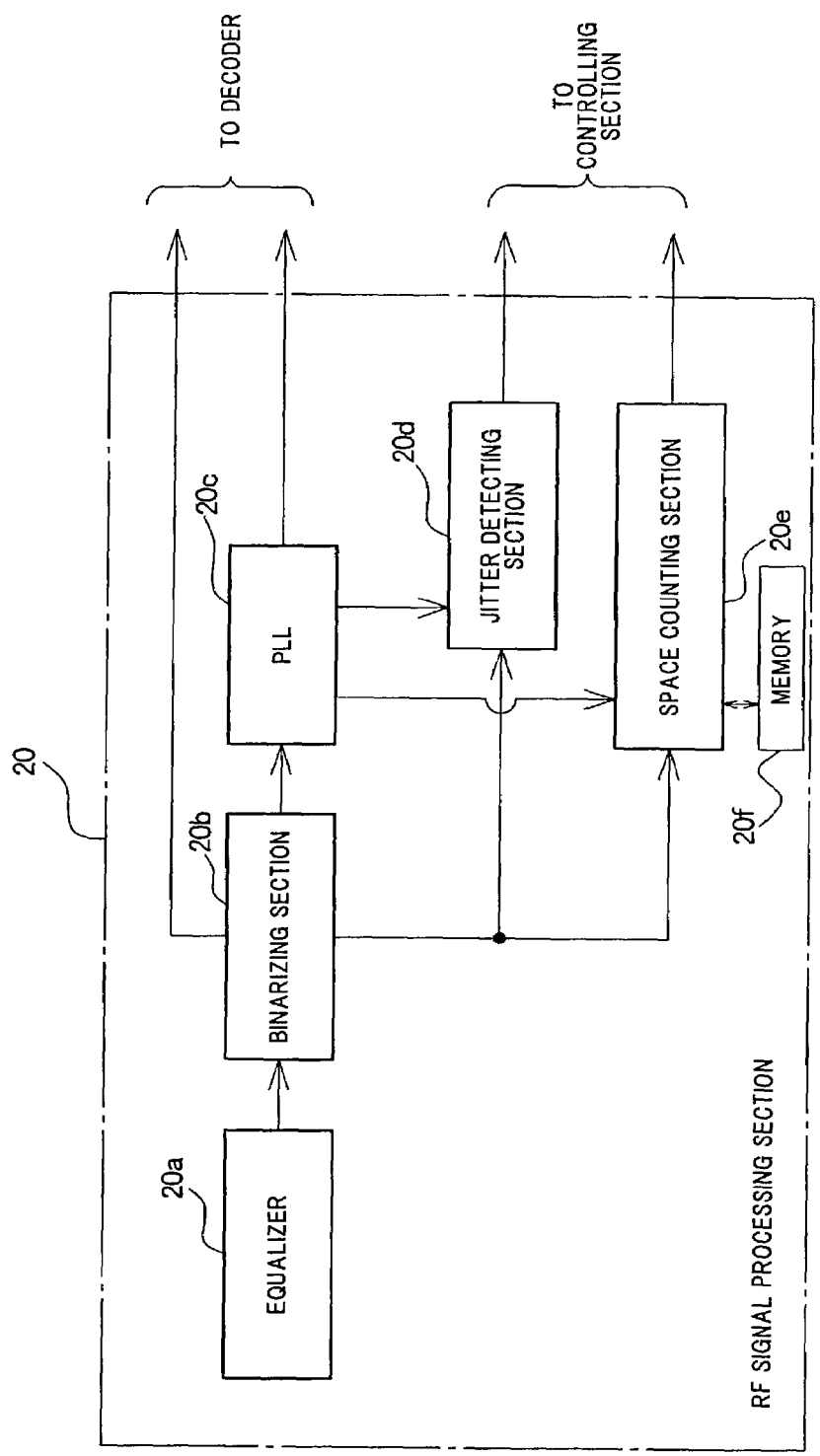
FIG. 2 is a structural block diagram of an RF signal processing section shown in FIG. 1.

FIG. 2 is a block diagram showing a structure of an RF signal processing section 20 of FIG. 1. The RF signal processing section 20 comprises an equalizer 20a, a binarizing section 20b, a PLL 20c, a jitter detecting section 20d, a space counting section 20e, and a memory 20f.

Figure 12:
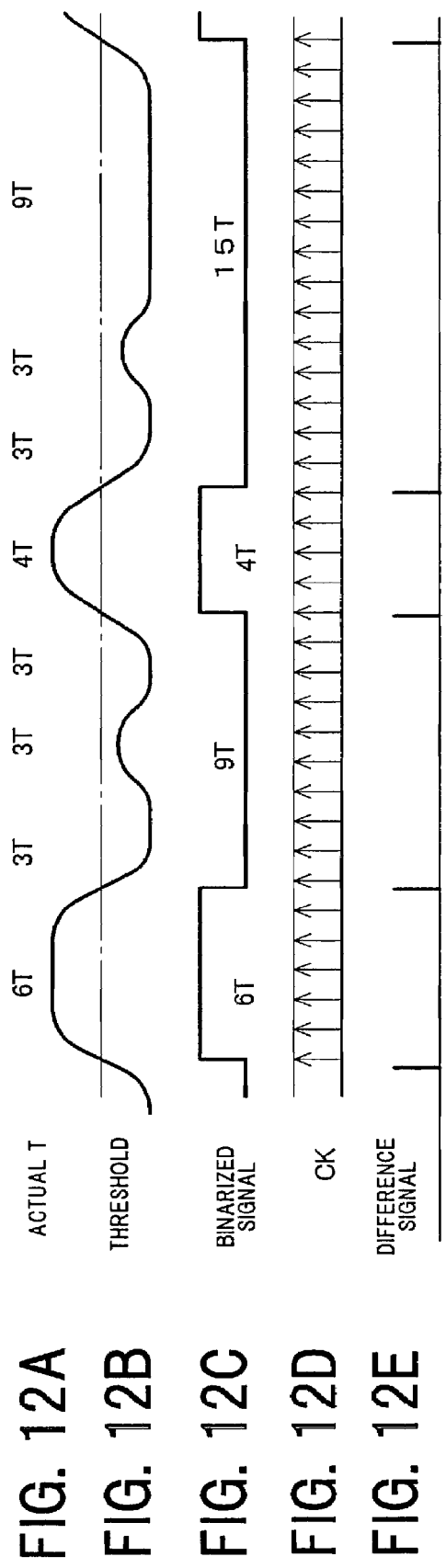
FIG. 12A is a diagram showing test data to be written.
FIG. 12B is a diagram showing a waveform of a replayed signal of the written test data (insufficient writing of a 3T mark period).
FIG. 12C is a diagram for explaining a binarized signal of the replayed signal shown in FIG. 12B.
FIG. 12D is a diagram showing a synchronous clock.
FIG. 12E is a diagram showing a difference signal for detecting jitter.
Figure 13:
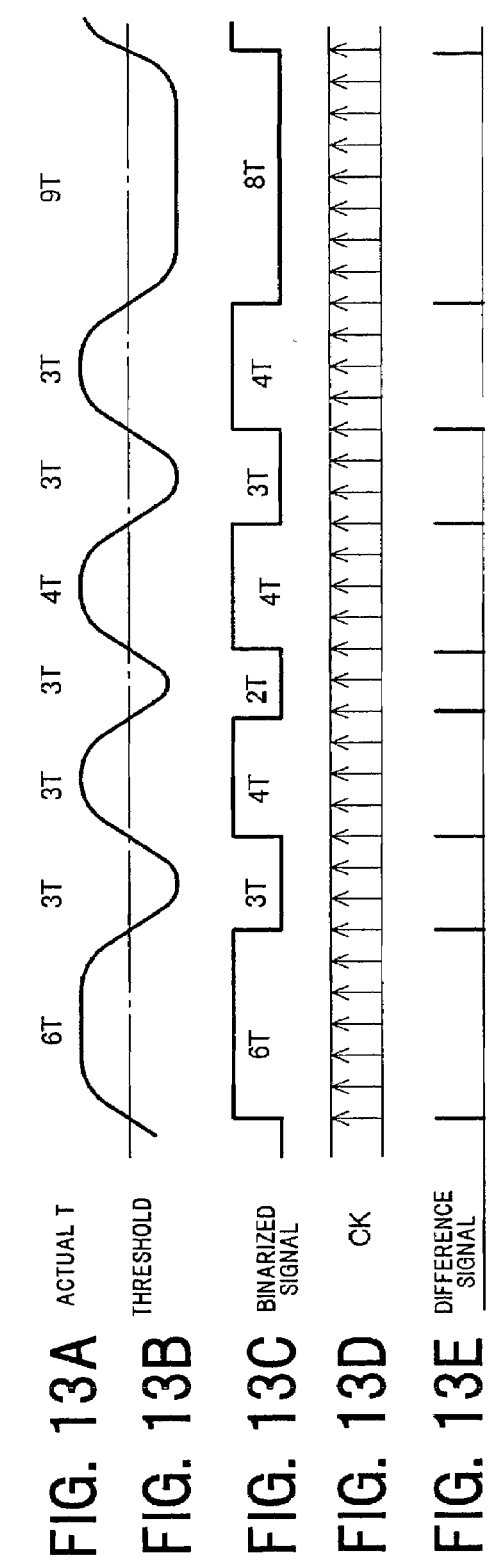
FIG. 13A is a diagram showing test data to be written.
FIG. 13B is a diagram showing a waveform of a replayed signal of the written test data (excessive writing of a 3T mark period).
FIG. 13C is a diagram for explaining a binarized signal of the replayed signal shown in FIG. 13B.
FIG. 13D is a diagram showing a synchronous clock.
FIG. 13E is a diagram showing a difference signal for detecting jitter.
Figure 14:
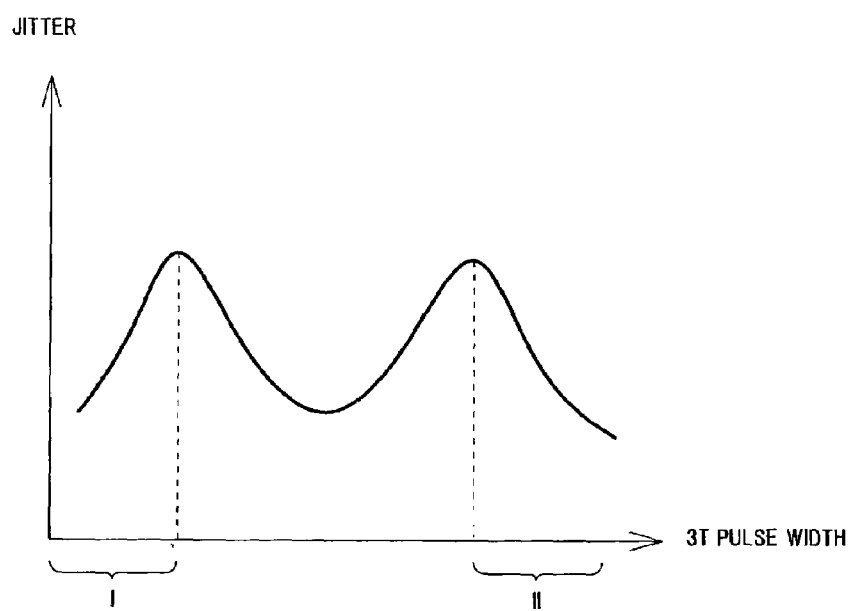
FIG. 14 is a graph showing a relationship between the data length of 3T data and jitter.

The equalizer 20a boosts a predetermined signal of the RF signal, the 3T signal for example, and supplies to the binarizing section 20b. The binarizing section 20b binarizes there played signal using a predetermined threshold value as shown in FIGS. 12B and 13B and supplies as a binarized signal to the PLL 20c. The PLL 20c generates a clock synchronized to the binarized signal and outputs this clock to the decoder 22.

The binarized signal from the binarizing section 20b and the synchronous clock from the PLL 20c are also supplied to the jitter detecting section 20d. The jitter detecting section 20d detects an edge difference between the binarized signal and the reference clock and supplies to the controlling section 24 as a jitter value. The binarized signal from the binarizing section 20b and the synchronous clock from the PLL 20c are also supplied to the space counting section 20e.

The space counting section 20e counts the length of the space section in the binarized signal from the binarizing section 20b based on the synchronous clock and judges whether or not the test data is normally written. When the space counting section 20e judges that an abnormality is present in the writing of test data, the space counting section 20e outputs a signal indicating the presence of an abnormality (abnormality signal) to the controlling section 24. The judgment of whether or not an abnormality is present in the test data writing is effected by comparing the count value of the space section that has been counted and a predetermined value which is stored in the memory 20f in advance. The controlling section 24 determines the optimum writing power based on the jitter value from the jitter detecting section 20d and the signal from the space counting section 20e.

FIGS. 3A–3D show a process at the space counting section 20e in the case of insufficient writing power. FIG. 3A shows a replayed binarized signal, FIG. 3B shows a synchronous clock, FIG. 3C shows a counted space value ("space count value"), and FIG. 3D shows an output signal from the space counting section 20e. Here, the actual test data is assumed to be a data string of 6T (space), 4T (mark), 3T (space), 3T (mark), and 9T (space) periods. A "mark" indicates that a pit is formed by illuminating laser light of a writing power while a "space" indicates that laser light of bias power is illuminated and no pit is formed. When the test data is normally written, a pattern identical to the test data string, that is, a pattern of 6T (space), 4T (mark), 3T (space), 3T (mark), and 9T (space) periods appears in the replayed signal. However, when the writing power is insufficient and the 3T (mark) period is not sufficiently written, the replayed binarized signal having a pattern of 6T (space), 4T (mark), and 15T (space) periods appears as shown in FIG. 3A. That is, because the 3T (mark) period is missing and is detected as a 3T (space) period, the length of the space period appears to be 3T+3T+9T=15T (space) along with the space periods immediately before and immediately after the missing 3T (mark) period. In FIG. 3A, the reference numeral 100 indicates a space period and the reference numeral 200 indicates a marking period.

When such space section of such binarized signal is counted using the synchronous clock shown in FIG. 3B, the space count value becomes 6T during the first space period and 15T in the next apparent space period as shown in FIG. 3C. One or more predetermined count values for determining output of an abnormality signal are stored in the memory 20f of the space counting section 20e. More specifically, when the count value is any one of 1T, 2T, 12T, 13T, or 15T, an abnormality signal is output from the space counting section 20e. Therefore, when a space count value of 15T is detected as shown in FIG. 3C, an abnormality signal as shown in FIG. 3D is output to the controlling section 24. In this manner, the controlling section 24 can judge that the test data is abnormally written because the signal for 3T is missing and can therefore judge that the jitter value is also abnormal.

FIGS. 4A–4D show a process at the space counting section 20e in a case where there has been an excessive writing power. The actual data in this case is 6T (space), 3T (mark), 3T (space), and 4T (mark) periods. In the example of FIGS. 3A–3D, the 3T mark period is missing, but in this example, the 3T mark period is excessively written and the 3T mark period appears to be a 4T mark period. In this case, as shown in FIG. 4A, the binarized signal has a pattern of 6T (space), 4T (mark), 2T (space), and 4T (mark) periods. In other words, the 3T (mark) period appears increased to 4T (mark) period and, consequently, the next 3T (space) period appears reduced to a 2T (space) period. When such a binarized signal is counted using the synchronous clock shown in FIG. 4B, the space counting section 20e detects 6T for the first space period and 2T for the next apparent space period as shown in FIG. 4C. Because the 2T period among these values matches an abnormal count value stored in the memory 20f in advance, the space counting section 20e outputs an abnormality signal to the controlling section 24 as shown in FIG. 4D when the space counting section 20e counts a space period of 2T.

Figure 5:
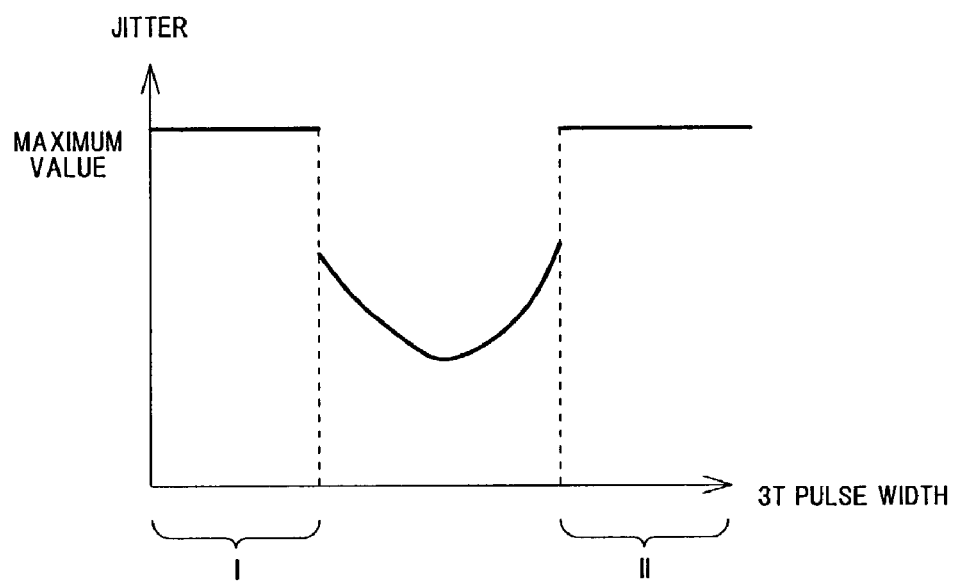
FIG. 5 is a graph showing a relationship between the data length of 3T data and jitter (jitter replaced with a maximum value).

FIG. 5 shows treatment of jitter value in the controlling section 24 when an abnormality signal is output from the space counting section 20e. In FIG. 5, the horizontal axis represents the pulse width of 3T (writing power) and the vertical axis represents jitter value. In region I where the writing power is insufficient and region II where the writing power is excessive, because an abnormality signal is output from the space counting section 20e, the controlling section 24 replaces the jitter value detected by the jitter detecting section 20d with a predetermined maximum value. More specifically, when the writing powers in OPC are P1, P2, and P3 with respective detected jitter values of η1, η2, and η3, and an abnormality signal is output for P1 and P3 but not for P2, the controlling section 24 uniformly replaces the jitter values for P1 and P3 with a value ηmax (ηmax is a maximum value) and leaves the detected jitter value η2 for P2 unchanged.

The optimum writing power will not be selected from regions I and II because the jitter value is set, in the algorithm for selecting an optimum writing power using the minimum jitter, at a maximum value in regions I and II. Thus, the controlling section 24 can determine the optimum writing power from the writing powers at which the jitter value is minimized in the region where the test data is normally written.

Figure 6:
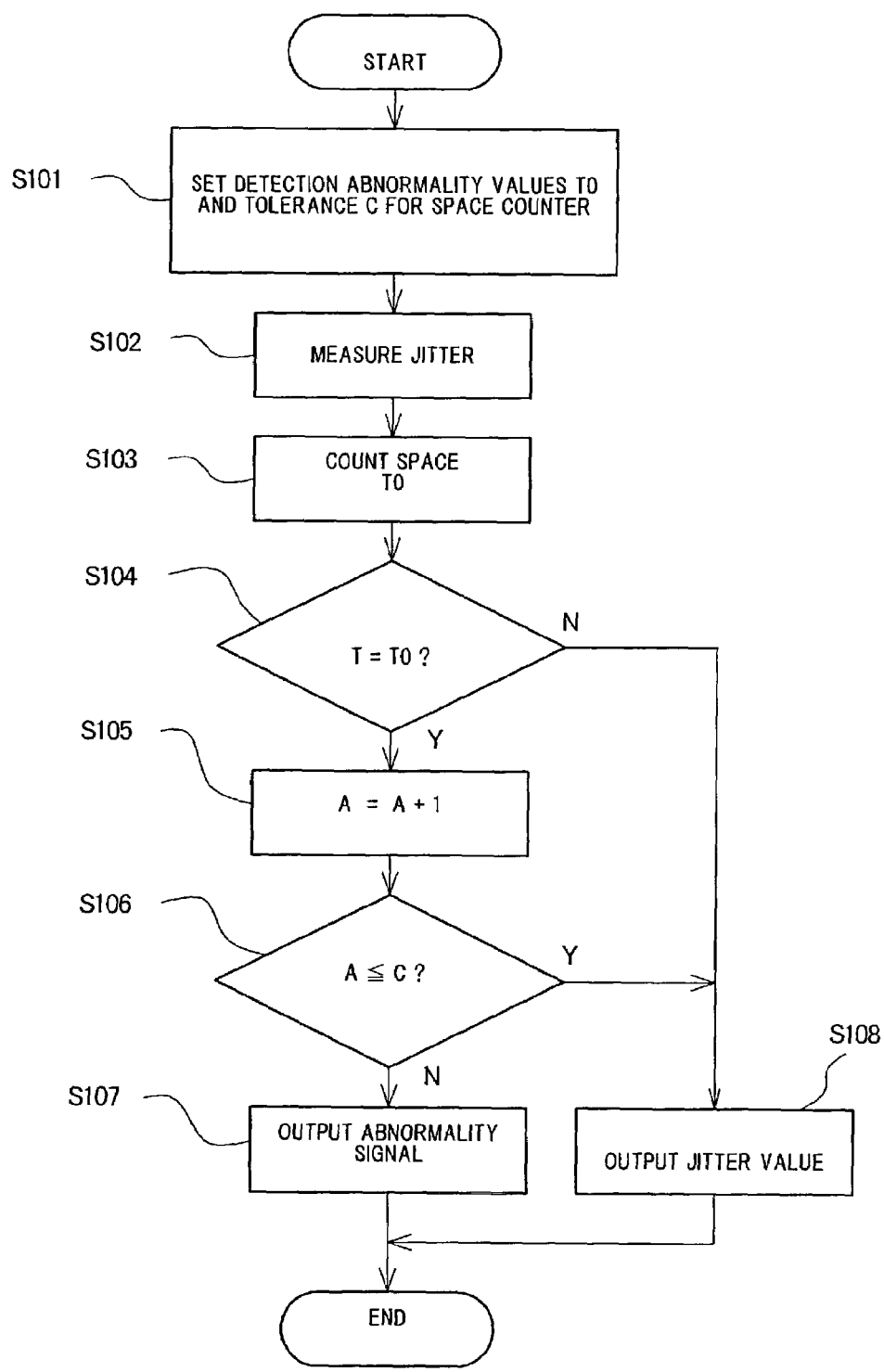
FIG. 6 is a flowchart showing the process for determining the optimum power.

FIG. 6 is a flow chart showing a process of the present embodiment. First, detection abnormality values T0 and a tolerance C for the space counting section 20e are set and stored in the memory 20f (step S101). As described, the detection abnormality values T0 are 1T, 2T, 12T, 13T, and 15T. The tolerance C is set, for example, as 3.

After the detection abnormality values T0 and the tolerance C are set, the jitter of the replayed binarized signal of test data is measured (step S102) and the space value of the binarized signal is counted (step S103). Then, it is judged whether or not the count value T of space matches any of the detection abnormality values T0 (Step S104). When the space count value T does not match any of the detection abnormality values T0, that is, when the space count value T is any value from 3T to 11T or 14T, it is judged that test data is normally written, and thus, the jitter value detected in step S102 is not changed and is output to the controlling section 24 (step S108). The controlling section 24 selects a writing power at which the jitter value is minimized, determines this writing power as the optimum writing power, and writes actual data. When writing data, the writing power may be feedback controlled such that the amount of return light is always a constant value (ROPC).

On the other hand, when the space count value T matches detection abnormality value T0, an abnormality occurrence number A is incremented by 1 (step S105) and it is judged whether or not the abnormality occurrence number A is less than or equal to the tolerance C (step S106). When the abnormality occurrence number A has not reached the tolerance C, it is judged that the test data is normally written and the jitter value detected in step S102 is not changed and is output (step S108). This is in consideration of the understanding that if, for example, a 3T (mark) period is missing or excessively written one time, the missing or excessive writing may not significantly affect the selection of the optimum writing power. The tolerance C is appropriately adjusted and set during the production process of the drive. It is also possible to set C to be 1 so that if there is even one missing or excessive writing generated, an abnormality signal is output. When an abnormality occurs a plurality of times and the abnormality occurrence number A exceeds the tolerance C, the space counting section 20e outputs an abnormality signal (step S107). When an abnormality signal is output, the controlling section 24 replaces the jitter value at the corresponding writing power with the maximum value, selects the writing power in which the jitter is minimized, and determines the selected writing power as the optimum writing power.

As described, in the present embodiment, by detecting the abnormality in space value which appears when 3T (mark) period is missing or excessively written, the erroneous writing of test data is detected, to thereby enable judgment that the jitter value is abnormal. However, in another case wherein, for example, the actual data string is 3T (space), 3T (mark), and 3T (space) periods, even when the 3T (mark) period is missing, the resulting space appears as 3T+3T+3T=9T, which means that the space value shows a normal value even though the 3T mark period is missing. As such, it is preferable to set the test data string to a particular data string such that when 3T is missing, the resulting space value always shows an abnormal value.

For example, when the test data string is set as a data string shown in FIG. 7A in which 11T (space) period always appears before 3T (mark) period, if the 3T (mark) period is missing, the space count value becomes at least 15T because of the addition of the spaces immediately before and immediately after the missing 3T (mark) period, and, thus, abnormality of test data caused by missing 3T (mark) period can be reliably detected as the space value becomes an abnormal value.

Alternatively, when the test data string is set as a data string as shown in FIG. 7B in which a 3T space period always appears after a 3T mark period, if the 3T mark period is excessively written and appears as a 4T (mark) period, for example, the count value of the following 3T (space) period becomes at most 2T and the space value becomes abnormal. Because of this, it is possible to reliably detect erroneous writing of test data. It is also preferable that, when the writing power is gradually varied for executing OPC, test data as shown in FIG. 7A be supplied when the writing power is small and test data as shown in FIG. 7B be supplied when the writing power is large.

In the above embodiment, an example of writing test data having a length from 3T to 14T is described. It is also possible to write test data in which a certain pattern is repeated, for example, a repetition of 4T such as 4T (mark), 4T (space), 4T (mark), 4T (space), etc., and to optimize the writing power based on the jitter value of this test data. In this case, because specific test data is employed, the space value which should appear is known and, thus, it is possible to set all space count values other than the known space value as the detection abnormality values.

Figures 8A, 8B, 8C, 8D:
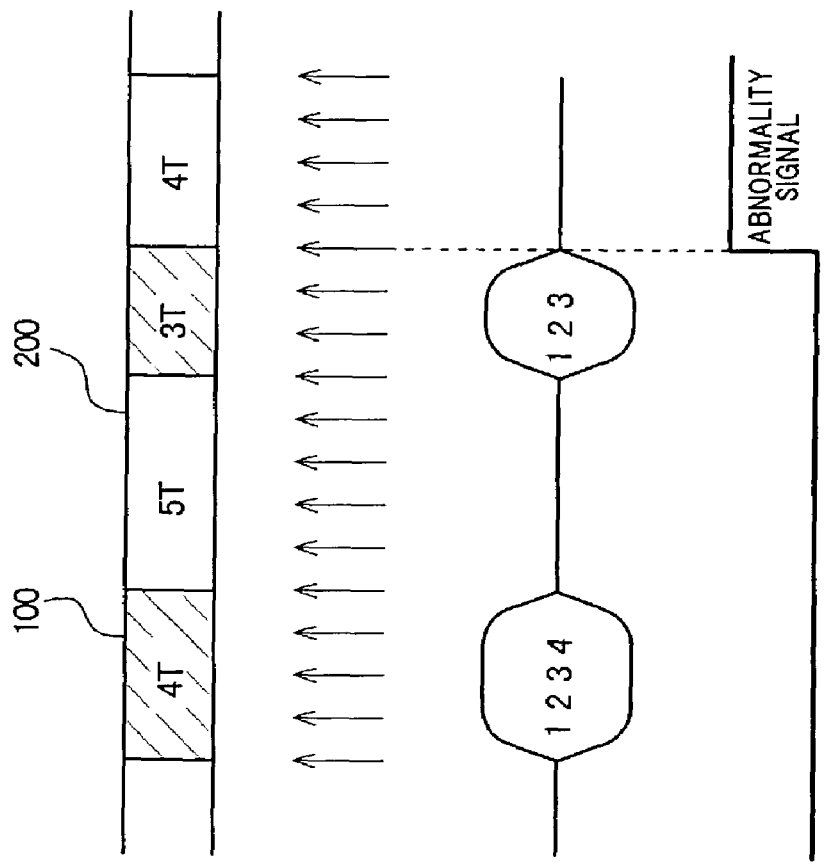
FIG. 8A is a diagram for explaining a test data pattern (excessive writing of a 4T mark period).
FIG. 8B is a diagram showing a synchronous clock.
FIG. 8C is a diagram for explaining a space count value in FIG. 8A.
FIG. 8D is a diagram for explaining output of an abnormality signal.

For example, as shown in FIGS. 8A–8D, in a case wherein a data string in which 4T is repeated is used as the test data, and when a portion of the 4T (mark) period is excessively written and appears as a 5T (mark) period and the subsequent 4T (space) period appears as a 3T (space) period as shown in FIG. 8A and the space value is counted using the synchronous clock shown in FIG. 8B, the actual 4T is detected in the first space period, but a 3T which differs from the actual space value is detected in the subsequent space value as shown in FIG. 8C. The memory 20f of the space counting section 20e stores 4T as the known space count value, or, alternatively, stores values other than 4T as abnormality detection values. As such, the space counting section 20e outputs an abnormality signal to the controlling section 24 when 3T (space) is detected, as shown in FIG. 8D. The controlling section 24 uniformly replaces the jitter value for writing power when the abnormality signal is output with a maximum value and selects the optimum writing power. Also with such a structure, it is possible to reliably detect erroneous writing of test data and to prevent erroneous determination of the optimum writing power based on the jitter value.

In the present embodiment, an example case is described wherein the 4T (mark) period is excessively written to appear as 5T (mark) period, but similar process can be applied when the writing power is insufficient and the 4T (mark) period appears to be 3T (mark) or less, or even in the case where the 4T (mark) period is completely missing. Because a value other than 4T is counted as the space count value, it is also possible to reliably detect the abnormal writing of test data in such a case. More specifically, it is possible to determine an erroneous writing due to an excessive writing power when the space count value is less than 4T and to determine an erroneous writing due to insufficient writing power when the space count value exceeds 4T.

As the specific pattern, any arbitrary pattern can be used such as, for example, a pattern of 3T (mark), 3T (space), 4T (mark), 3T (space), 5T (mark), 3T (space) periods, and so on. In this case, the abnormality signal can be output when the space count value is any value other than 3T.

Figure 9:
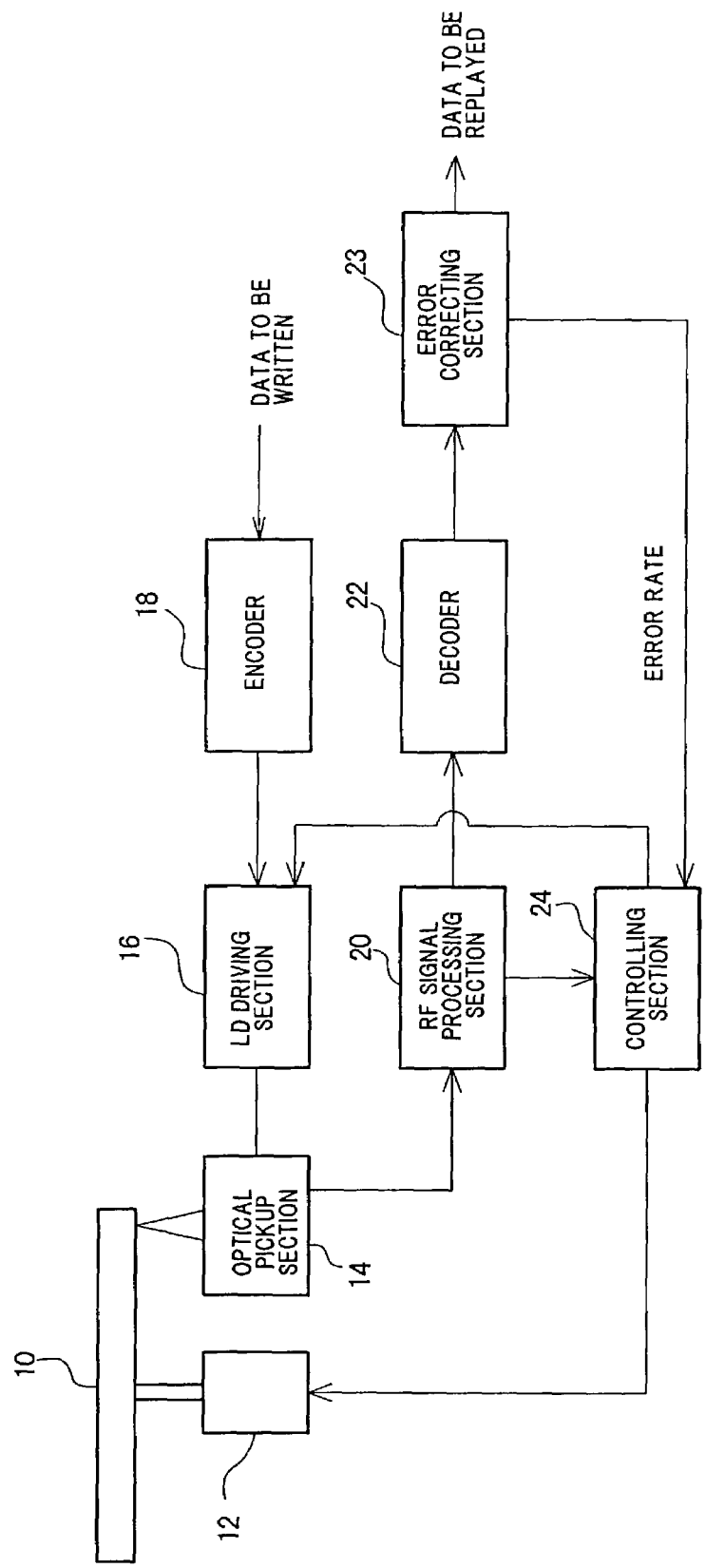
FIG. 9 is another structural block diagram of another optical disk device.

FIG. 9 is a block diagram showing another structure of an optical disk device. The optical disk device shown in FIG. 9 differs from the optical disk device of FIG. 1 in that, in the optical disk device of FIG. 9, when an error correction is performed by an error correcting section 23 for the replayed data output from the decoder 22, the error rate is supplied to the controlling section 24. In this structure, the space counting section 20e is not required in the RF signal processing section 20.

In this configuration, a jitter value is supplied from the RF processing section 20 to the controlling section 24 and an error rate is supplied from the error correcting section 23 to the controlling section 24. The controlling section 24 determines the optimum writing power based on these two values representing the quality of the replayed signal.

Figure 10:
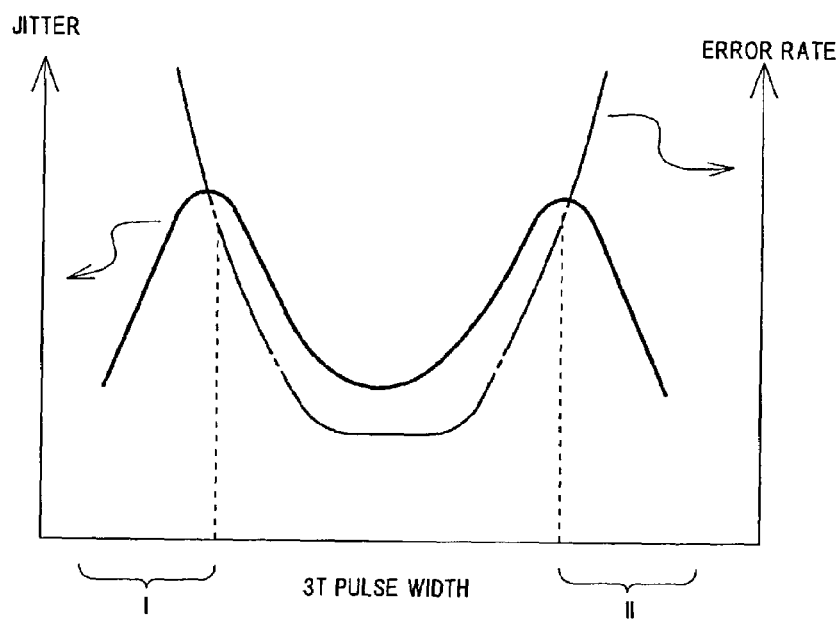
FIG. 10 is a graph showing relationships between the data length of 3T data and jitter and between the data length of 3T data and error rate.

FIG. 10 shows relationships between the pulse width of 3T (writing power) and jitter value and between the 3T pulse width and error rate. The relationship between the 3T pulse width and the jitter value is already described above, and shows a characteristic in that when the 3T is missing or excessively written, the detected jitter value appears reduced. On the other hand, the error rate continues to increase in these regions as the 3T is not normally written. Therefore, even when the jitter value is small, when the error rate exceeds a tolerance value, it is possible to judge that the test data is not normally written, and to prevent erroneous determination of optimum writing power based only on the jitter value. Based on this principle, the controlling section 24 determines the optimum writing power utilizing both the jitter value and the error rate.

Figure 11:
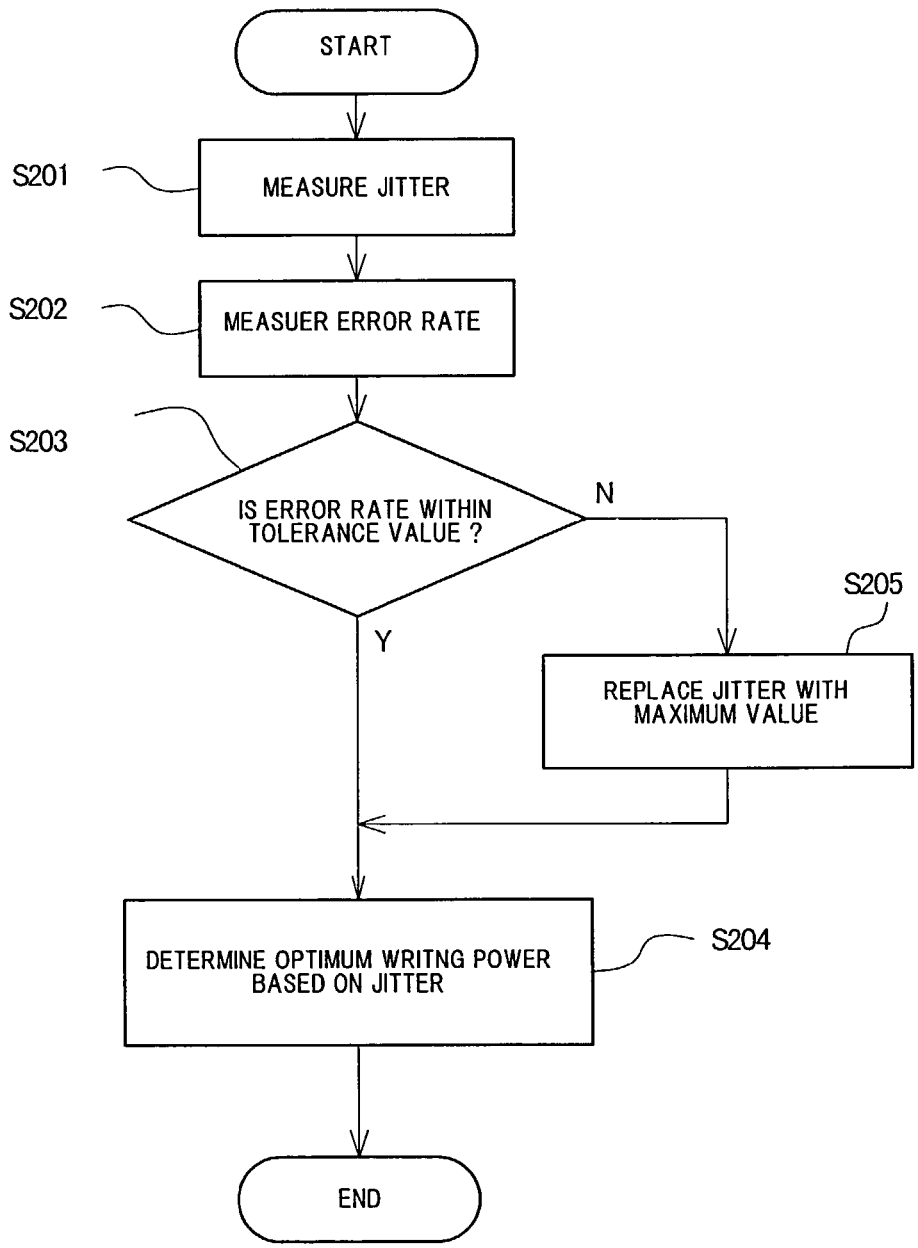
FIG. 11 is a flowchart for another process for determining an optimum power.

FIG. 11 shows a flowchart of the processes of this embodiment. First, the jitter value of a replayed binarized signal of test data is measured at the RF signal processing section 20 (step S201). At the same time, the error rate of the replayed data is measured by the error correcting section 23 (step S202). The measured jitter value and error rate are both supplied to the controlling section 24. The controlling section 24 judges whether or not the error rate is less than or equal to a predetermined tolerance value (step S203). When the error rate is less than or equal to the predetermined tolerance value, it is judged that the test data is normally written and a writing power at which the jitter value is minimized is selected and determined as the optimum writing power (step S204).

When, on the other hand, the error rate exceeds the predetermined tolerance value, it can be judged that the test data is not normally written, and the controlling section 24 therefore uniformly replaces the jitter value at the writing power at which an abnormality signal is output with a maximum value (step S205) and determines the optimum writing power based on the replaced jitter value. Obviously, during this process, the optimum writing power is selected from writing powers other than the writing power in which the jitter is replaced.

Although preferred embodiments of the present invention have been described using a DVD-R as an example of an optical disk, the present invention is not limited to such a configuration, and can be applied similarly to, for example, CD-R, CD-RW, or DVD-RW systems. In the case of a CD system, because data of 3T to 11T are present, it is possible to set 1T, 2T, and 12T as the space value for judging abnormality.

In the second embodiment, the abnormality of jitter value is detected when the space value differs from the actual count value and when the abnormality in jitter value is detected, the jitter value is uniformly replaced with a maximum value. However, the present invention is not limited to such a configuration, and it is also possible to reject the jitter value as "NG" (no good) or as immeasurable when the abnormality in jitter value is detected, to thereby remove the writing power from the candidates for the optimum writing power.

In the above embodiments, the writing power at which the jitter value is minimized is determined as the optimum writing power. However, the present invention is not limited to such a configuration, and can be similarly applied to cases where the optimum writing power is determined based on any other signal quality of the replayed signal such as, for example, the β value.

Also in the embodiments, the erroneous writing of test data has been described in particular using an example of missing 3T or excessive writing of 3T which is the shortest period. However, the present invention is not limited to such a configuration, and the erroneous writing of test data can also be detected using, for example, data of length 4T or greater in addition to the 3T data.

Although in the description of the embodiments the jitter value is detected by a jitter detecting section 20d within the RF signal processing section 20, the present invention is also not limited to such a configuration, and it is also possible to detect the jitter value by the controlling section 24. Similarly, the space count may be counted in the controlling section 24 instead of the space counting section 20e as described.

What is claimed is:
1. An optical disk device comprising:
   means for writing test data onto an optical disk while varying laser light power;

means for replaying said test data;
means for judging presence of an abnormality in said test data based on a space value of the replayed signal and not based on a mark value of the replayed signal; and
means for optimizing said laser light power based on the judgment result by said means for judging.

2. An optical disk device according to claim 1, wherein said means for judging judges the abnormality of said test data when said space value is a value which should not exist.

3. An optical disk device according to claim 1, wherein said means for judging judges the abnormality of said test data when said space value is any on of 1T, 2T, 12T, 13T, and 15T.

4. An optical disk device according to claim 1, wherein said means for judging judges the abnormality of said test data when an abnormality is present in said space value which is caused by a missing 3T mark period or an excessive writing of 3T mark period in said replayed signal.

5. An optical disk device according to claim 1, wherein said test data has a pattern in which an 11T space period is provided before a 3T mark period; and
said means for judging judges the abnormality of said test data when said space value is 15T or greater.

6. An optical disk device according to claim 1, wherein said test data has a pattern in which a 3T space period is provided after a 3T mark period; and
said means for judging judges the abnormality of said test data when said space value is 2T or less.

7. An optical disk device according to claim 1, wherein said test data has a pattern with a known and fixed length space period; and
said means for judging judges the abnormality of said test data when said space value does not match said fixed length.

8. An optical disk device according to claim 1, wherein said means for optimizing selects, as the optimum laser light power, the laser light power at which the jitter of said replayed signal is minimized; and
said means for judging increases the jitter of the replayed signal of test data when said test data is judged to be abnormal.

9. An optical disk device according to claim 1, wherein said means for judging replaced the jitter of the replayed signal of test data with a predetermined maximum value when said test data is judged to be abnormal.

10. An optical disk device comprising:
means for writing test data onto an optical disk while varying laser light power;
means for replaying said test data;
means for detecting jitter of the replayed signal;
means for optimizing laser light power based on said jitter;
means for detecting error rate of said replayed signal; and
means for detecting abnormality which outputs a signal indicating an abnormality in said jitter when said error rate is greater than or equal to a predetermined value; wherein
said means for optimizing selects, as the optimum laser light power, the laser light power at which said jitter is minimized; and
said means for detecting abnormality increases said jitter when said error rate is greater than or equal to said predetermined value.

11. An optical disk device according to claim 10, wherein said means for detecting abnormality replaces said jitter with a predetermined maximum value when said error rate is greater than or equal to said predetermined value.

12. An optical disk device comprising:
an optical pickup for writing test data onto an optical disk while varying laser light power and for outputting a replayed signal of said test data;
an evaluation circuit for evaluating the quality of said replayed signal;
a counter for counting a space value of said replayed signal; and
a controller for optimizing said laser light power based on the evaluation result in said evaluation circuit and the space value of said replayed signal.

13. An optical disk device according to claim 12, wherein when said space value is a value which should not exist, said controller removes, from candidate values for the optimum laser light power, any laser light power at which such a space value is obtained.

14. An optical disk device according to claim 12, wherein when said space value is a value which should not exist, said controller changes said evaluation value to a predetermined abnormality value and optimizes said laser light power.

15. An optical disk device according to claim 12, further comprising:
a memory for storing one or more abnormality values of said space value, wherein
when said space value matches any of the abnormality values stored in said memory, said controller removes, from candidate values for the optimum laser light power any laser light power at which such a space value is obtained.

16. An optical disk device according to claim 12, further comprising:
a memory for storing one or more normal values of said space value, wherein
when said space value does not match any of the normal values stored in said memory, said controller removes, from candidate values for the optimum laser light power, any laser light power at which such a space value is obtained.

17. An optical disk device according to claim 12, wherein said test data has a pattern in which a 11T space period is provided before a 3T mark period; and
when said space value is 15T or greater, said controller removes, from candidate values for the optimum laser light power, any laser light power at which such a space period is obtained.

18. An optical disk device according to claim 12, wherein said test data has a pattern in which a 3T space period is provided after a 3T mark period, and
when said space value is 2T or less, said controller removes, from candidate values for the optimum laser light power, any laser light power at which such space value is obtained.

19. An optical disk device according to claim 12, wherein said test data has a pattern with a known and fixed length space value; and
when said space value is a value other than said fixed length, said controller removes, from candidate values for the optimum laser light power, any laser light power at which such a space value is obtained.

* * * * *

UNITED STATES PATENT AND TRADEMARK OFFICE
CERTIFICATE OF CORRECTION

PATENT NO. : 7,116,617 B2 Page 1 of 1
APPLICATION NO. : 10/241254
DATED : October 3, 2006
INVENTOR(S) : N. Takeda It is certified that error appears in the above-identified patent and that said Letters Patent is hereby corrected as shown below:

| COLUMN | LINE | |
|---|---|---|
| Title page, item (73) | Assignee | "Teac Corporation," should read --TEAC Corporation,-- |
| Col. 11 (Claim 3) | 13 | "any on of" should read --any one of-- |

Signed and Sealed this

Twenty-seventh Day of March, 2007

JON W. DUDAS
*Director of the United States Patent and Trademark Office*